United States Patent
Froeschle et al.

(10) Patent No.: US 7,380,870 B2
(45) Date of Patent: Jun. 3, 2008

(54) AIR GUIDING SYSTEM FOR A VEHICLE

(75) Inventors: Mathias Froeschle, Ostfildern (DE);
Markus Schwarz, Moeglingen (DE);
Joachim Paul, Stuttgart (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 11/727,610

(22) Filed: Mar. 27, 2007

(65) Prior Publication Data

US 2007/0228772 A1 Oct. 4, 2007

(30) Foreign Application Priority Data

Mar. 28, 2006 (DE) .................. 10 2006 014 264

(51) Int. Cl.
*B62D 35/00* (2006.01)
(52) U.S. Cl. .............. 296/180.5; 180/903; 296/26.12; 296/180.1
(58) Field of Classification Search ............... 105/1.3; 180/903; 244/213; 296/26.01, 26.12, 26.13, 296/180.1, 180.2, 180.3, 180.4, 180.5
See application file for complete search history.

(56) References Cited

U.S. PATENT DOCUMENTS

| | | | | |
|---|---|---|---|---|
| 1,274,986 A | * | 8/1918 | Carolin ................... | 244/213 |
| 1,762,002 A | * | 6/1930 | Van De Putte ........... | 244/213 |
| 3,791,468 A | * | 2/1974 | Bryan, Jr. ................ | 180/69.2 |
| 4,773,692 A | * | 9/1988 | Schleicher et al. ...... | 296/180.5 |
| 4,925,236 A | * | 5/1990 | Itoh et al. ................ | 296/180.5 |
| 5,013,081 A | * | 5/1991 | Cronce et al. ........... | 296/180.1 |
| 5,120,105 A | * | 6/1992 | Brin et al. ............... | 296/180.5 |
| 5,536,062 A | * | 7/1996 | Spears .................... | 296/180.3 |
| 6,382,708 B1 | * | 5/2002 | Erdelitsch et al. ....... | 296/180.5 |
| 6,672,651 B1 | * | 1/2004 | Shuen ..................... | 296/180.5 |
| 2002/0074826 A1 | * | 6/2002 | Presley ................... | 296/180.1 |
| 2007/0001482 A1 | | 1/2007 | Larson | |

FOREIGN PATENT DOCUMENTS

| | | |
|---|---|---|
| DE | 30 19 150 A1 | 11/1981 |
| DE | 43 05 090 A1 | 8/1994 |

(Continued)

OTHER PUBLICATIONS

German Office Action dated Dec. 7, 2006 including English Translation (Six (6) pages).

(Continued)

*Primary Examiner*—D. Glenn Daydan
*Assistant Examiner*—Paul A Chenevert
(74) *Attorney, Agent, or Firm*—Crowell & Moring LLP

(57) ABSTRACT

An air guiding system for a vehicle, particularly for a passenger car, is arranged in a rear area of the vehicle and has at least one central main air guiding element that can be displaced from a moved-in inoperative position into a moved-out operative position. Lateral auxiliary air guiding elements are displaceable together with each central main air guiding element. The lateral auxiliary air guiding elements can be rotated with respect to each central main air guiding element about a respective pivot fixed to the main air guiding element in order to change them from an also moved-in inoperative position into an also moved-out operative position.

8 Claims, 4 Drawing Sheets

FOREIGN PATENT DOCUMENTS

| DE | 10 2004 030 571 A1 | | 1/2006 | |
| DE | 10 2004 030 571 A1 | | 1/2007 | |
| DE | 10 2005 030 203 A1 | | 1/2007 | |
| EP | 271757 A2 | * | 6/1988 | .................. 244/46 |
| JP | 60163773 A | * | 8/1985 | .............. 296/180.5 |
| JP | 2-117476 A | | 5/1990 | |
| JP | 03000578 A | * | 1/1991 | .............. 296/180.1 |
| JP | 03281484 A | * | 12/1991 | .............. 296/180.1 |

OTHER PUBLICATIONS

European Search Report dated Jul. 5, 2007 with English translation of relevant portion (Seven (7) Pages).

* cited by examiner

AIR GUIDING SYSTEM FOR A VEHICLE

RELATED APPLICATIONS

This application claims the benefit of priority under 35 U.S.C. § 119 to German Patent Application No. 10 2006 014 264 filed Mar. 28, 2006, the disclosure of which is incorporated herein by reference in its entirety.

BACKGROUND AND SUMMARY OF INVENTION

The present invention relates to an air guiding system for a vehicle particularly for a passenger car, which is arranged in a rear area of the vehicle and comprises at least one central main air guiding element which can be displaced from a moved-in inoperative position into a moved-out operative position, lateral auxiliary air guiding elements being displaceable together with the or each central main air guiding element.

DE 30 19 150 A1, discloses a vehicle air guiding system that is arranged in an upper rear area of the vehicle and has an air guiding element that can be displaced from an inoperative position, in which it is integrated in the shaping of the rear area flush with the surface, into a moved-out operative position. The air guiding element is constructed as an aerofoil which, by way of an operating device, can be displaced or changed from the inoperative position into the operative position and vice-versa.

DE 43 05 090 A1 also discloses a vehicle air guiding system that is arranged in a rear area of the vehicle and has an air guiding element that can be displaced from an inoperative position into a moved-out operative position The air guiding element is formed by a rear spoiler arranged in a recessed receiving device of the vehicle body and displaceable by way of an operating device from the inoperative position to the operative position and vice-versa.

The air guiding systems known from DE 30 19 150 A1 and DE 43 05 090 A1 allows the rear axle output coefficient ($c_{ah}$-value) of the motor vehicle to be increased while the drag coefficient ($c_w$-value) remains the same or is improved. Each of these known air guiding elements have the same transverse dimension in the inoperative position and in the operative position.

Yet unpublished DE 10 2005 030 203 discloses a vehicle air guiding system that has a central main air guiding element as well as two lateral auxiliary air guiding elements that allow the transverse dimension of the air guiding system to be enlarged in the operative position and particularly the rear axle output coefficient to be further increased. DE 10 2005 03 203 discloses that the adjusting movement of the lateral auxiliary air guiding elements with respect to the central main air guiding element takes place when the main air guiding element was displaced from the inoperative position into the operative position. The adjustment of the auxiliary air guiding elements with respect to the main air guiding element therefore takes place after the, and uncoupled from, displacement of the main air guiding element.

An object of the present invention is to provide a novel vehicle air guiding system by allowing the lateral auxiliary air guiding elements to be rotated with respect to the or each central main air guiding element about one pivot respectively fixed to the main air guiding element, in order to change the lateral auxiliary air guiding elements from an also moved-in inoperative position to an also moved-out operative position According to an advantageous further development of the invention, the air guiding device couples the adjustment of the lateral auxiliary air guiding elements to the displacement of the, or each, central main air guiding element during its or their change from the inoperative position into the operative position and vice-versa. Thereby, the lateral auxiliary air guiding elements can be changed isochronously or simultaneously with the displacement of the or each central main air guiding element with respect to the or each central air guiding element from the inoperative position into the operative opposition and from the operative position into the inoperative position respectively. In this case, the lateral auxiliary air guiding elements are rotated with respect to the or each central main air guiding element about one pivot respectively fixed to the main air guiding element. Within a very short time and in a simple manner, the transverse dimension of the air guiding system according to the invention can thereby be adapted.

Preferably, an operating device is assigned to each lateral auxiliary air guiding element for the purpose of its rotation with respect to the central main air guiding element. A coupling device is applied to the operating device to couple the rotation of the or each lateral auxiliary air guiding element with respect to the central main air guiding element to the displacement of the central main air guiding element.

Other objects, advantages and novel features of the present invention will become apparent from the following detailed description of the invention when considered in conjunction with the accompanying drawings.

DETAILED DESCRIPTION OF THE INVENTION

Figure 1:
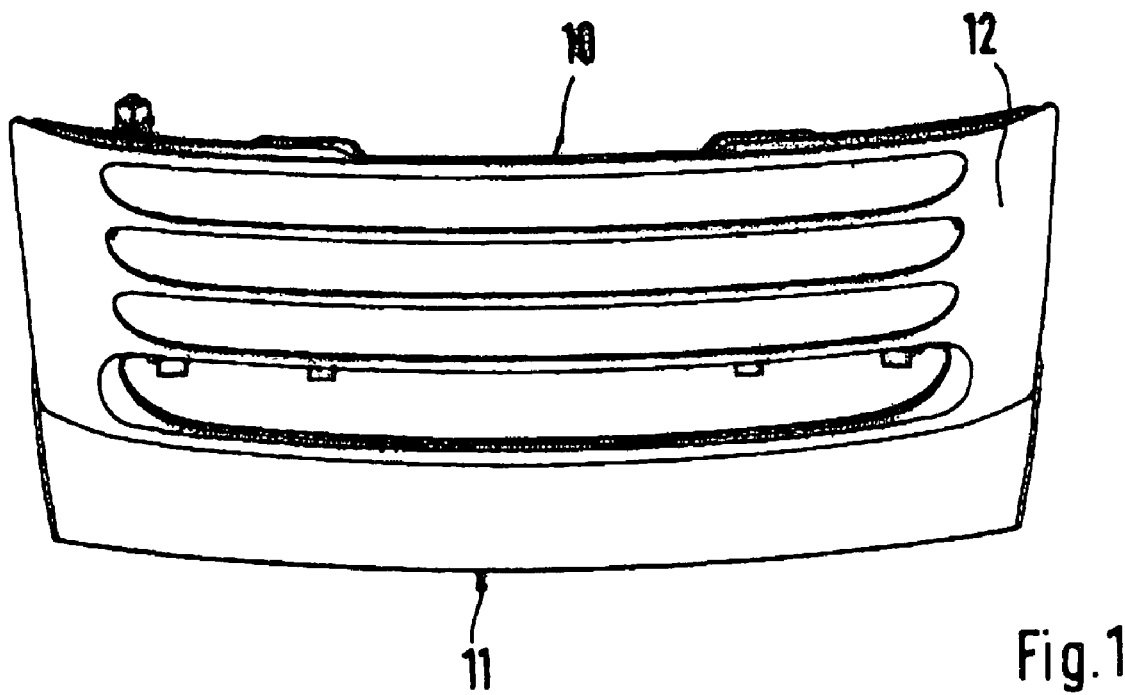
FIG. 1 is a plan view of an air guiding system according to the invention in the inoperative position.
Figure 2:
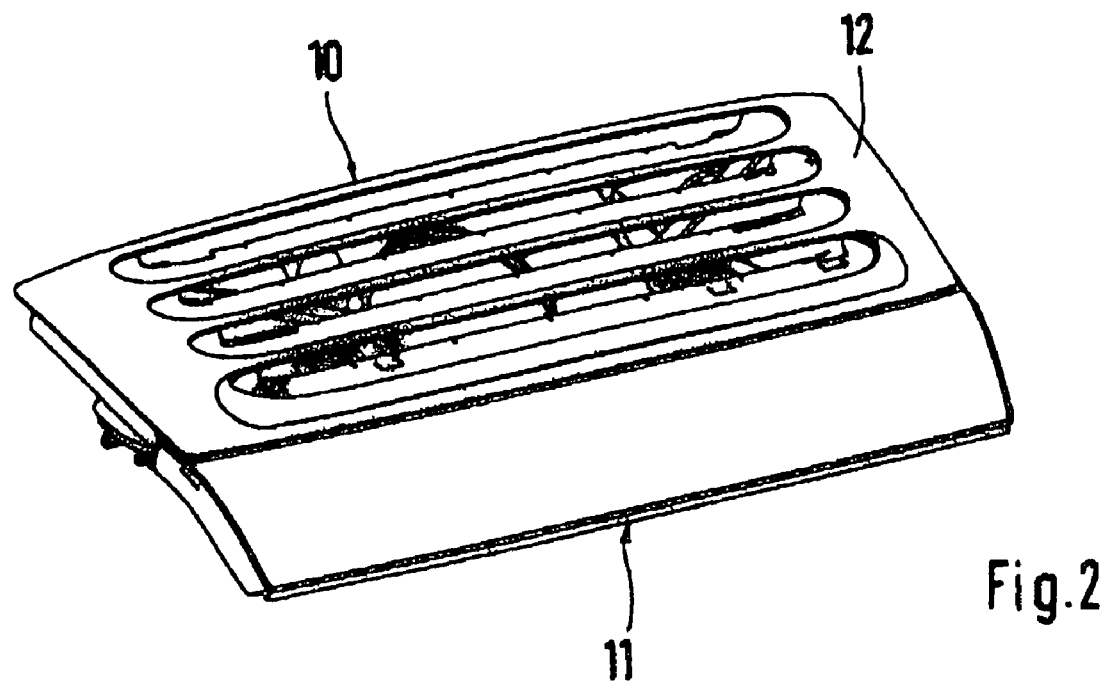
FIG. 2 is a perspective view diagonally from the rear of the air guiding system of FIG. 1 in the inoperative position.
Figure 3:
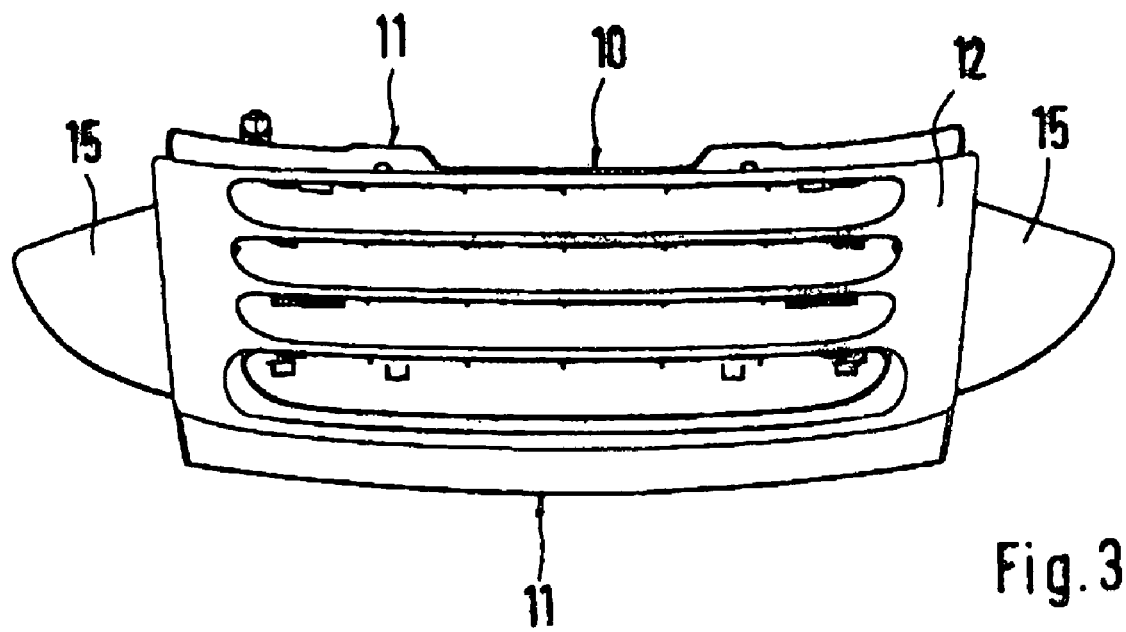
FIG. 3 is a plan view of the air guiding system of FIGS. 1 and 2 in the operative position.
Figure 4:
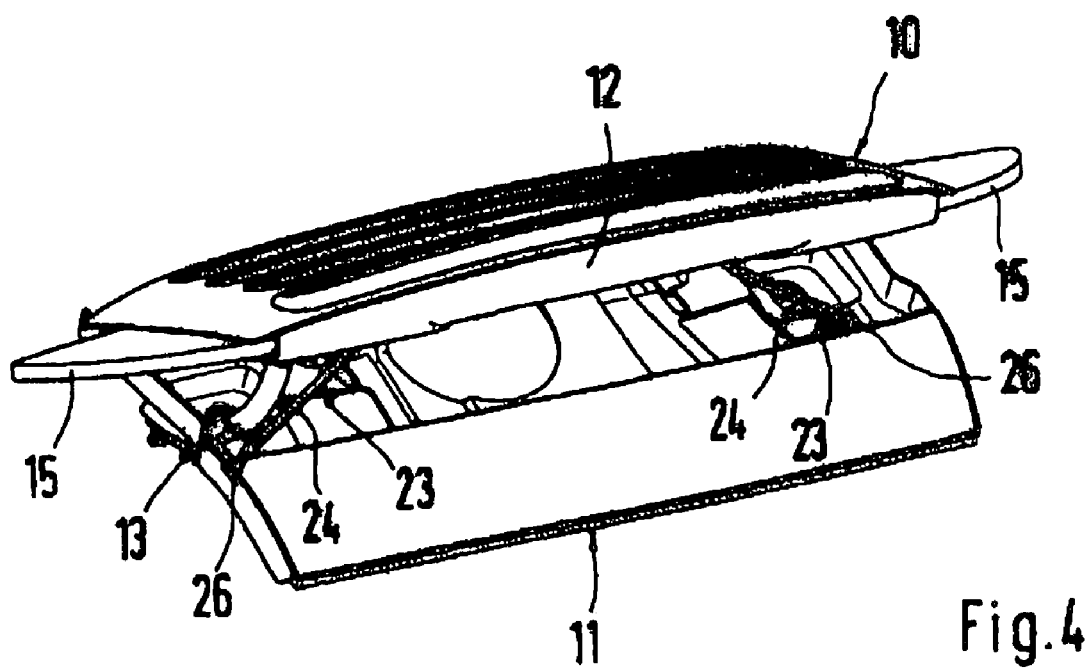
FIG. 4 is a perspective view diagonally from the rear of the air guiding system of FIGS. 1 and 2 in the operative position.
Figure 5:
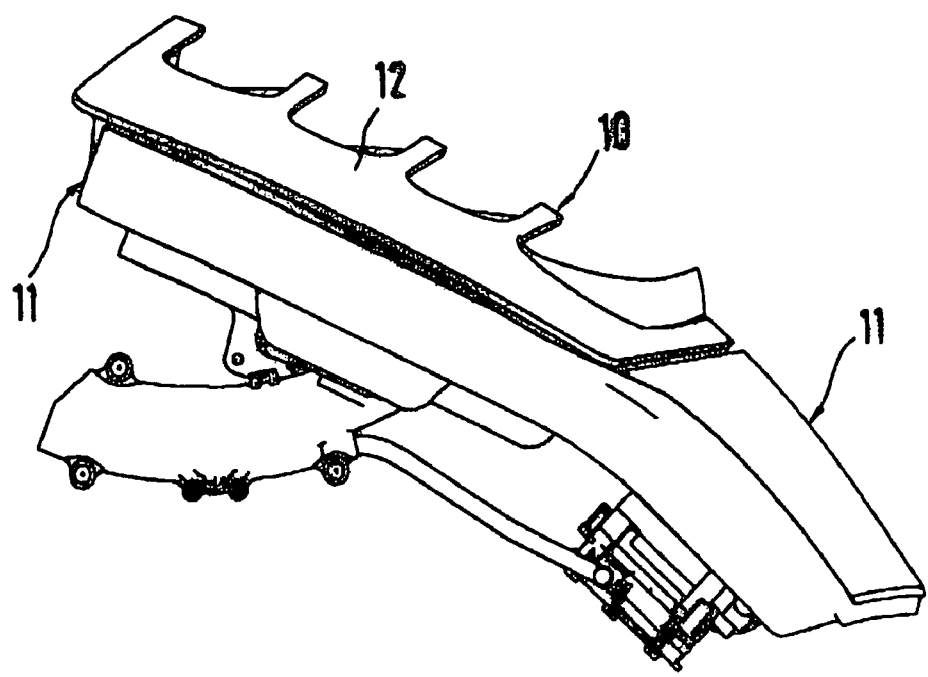
FIG. 5 is a side view of the air guiding system of FIGS. 1 to 4 in the inoperative position.
Figure 6:
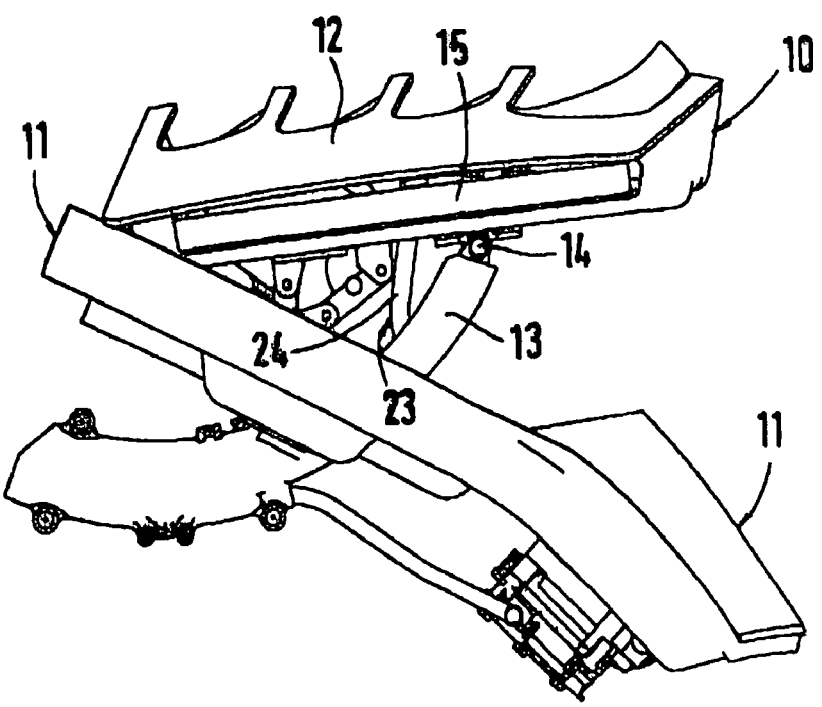
FIG. 6 is a side view of the air guiding system of FIGS. 1 to 4 in the operative position.

FIGS. 1 to 6 illustrate an air guiding system 10 of a vehicle according to the present invention together with a vehicle body section 11 of a rear area of the vehicle. FIGS. 1, 2 and 5 show the air guiding system 10 in an inoperative position, in which it is integrated flush with the surface into the course of the shape of the rear area or in the vehicle body section 11 of the rear area. In contrast, FIGS. 3, 4 and 6 show the air guiding system 10 in an operative position, in which the latter has moved out for increasing the rear axle output coefficient with respect to rear area or the vehicle body section 11 of the rear area.

The air guiding system 10 according to the invention has a central main air guiding element 12 which can be displaced by an operating device 13 (see FIGS. 4 and 6) from the moved-in inoperative position into the moved-out operative position in the upward direction. On both sides of the main air guiding element 12, preferably one operating device 13 respectively is associated with the central main air guiding element 12 by way of a joint 14.

In addition to the main air guiding element 12, which has the same transverse dimension in the moved-in inoperative position as in the moved-out operative position, the air guiding system 10 according to the invention has two lateral auxiliary air guiding elements 15 which, in an inoperative position (see FIGS. 1, 2, and 5), have moved in and are not visible, and in an operative position (see FIGS. 3, 4, and 6) have moved out and are visible while enlarging the transverse dimension of the air guiding system 10 according to the invention.

In the moved-in inoperative position, the auxiliary air guiding elements 15 are completely accommodated in the main air guiding element 12 or are completely covered by the main air guiding element 12. During the change or displacement, the central main air guiding element 12 is swiveled from the inoperative position into the operative position or from the operative position into the inoperative position and in the process is lifted or lowered, with the two lateral auxiliary air guiding elements 15 going along in this movement of the central main air guiding element 12.

In the preferred illustrated embodiment of the present invention, the two lateral auxiliary air guiding elements 15 are isochronously or simultaneously with the swiveling displacement of the central main air guiding element 12 rotatable with respect to the central main air guiding element 12 about one pivot 16 (see FIGS. 7 and 8) fixed to the main air guiding element 12 respectively, in order to change these from the moved-in inoperative position (see FIG. 7) into the moved-out operative position (see FIG. 8) or from the operative position into the inoperative position.

The change of the lateral auxiliary air guiding elements 15 from the inoperative position into the operative position or vice-versa, i.e., between the two positions, is coupled to the displacement of the main air guiding element 12 from the inoperative position into the operative position or vice-versa. Thereby, the auxiliary air guiding elements 15 can be changed simultaneously or isochronously with the main air guiding element 12 from the inoperative position into the operative position or from the operative position into the inoperative position.

For rotating the lateral auxiliary air guiding elements 15 with respect to the central main air guiding element 12 about the pivots 16 fixed to the main air guiding element, an operating device 17 is assigned to each auxiliary air guiding element 15. In the illustrated embodiment, the operating device 17 is constructed as a bent operating element 18. In the following, the operating element 18 will also be called an operating rod, but may also be called an operating guide rod.

Each of the operating rods 18 is connected by way of a first end 19 in an articulated manner with the main air guiding element 12. The first end 19 of the bent operating rod 18 is applied to the main air guiding element via a joint 20. By way of a second end 21, each operating rod 18 is applied to a lateral auxiliary air guiding element 15, specifically to a connecting link guide 22 of the lateral auxiliary air guiding element 15.

Figure 7:
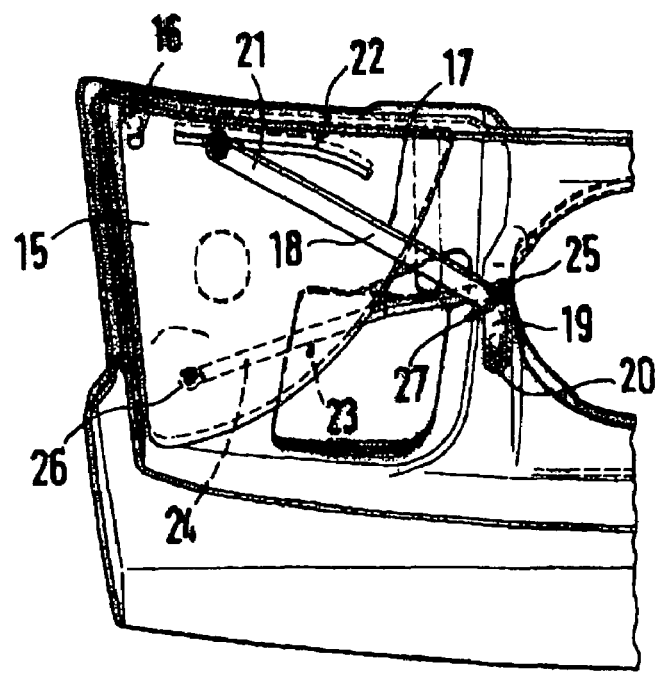
FIG. 7 is a detail view of the air guiding system of FIGS. 1 to 6 in the inoperative position in the area of an auxiliary air guiding element.
Figure 8:
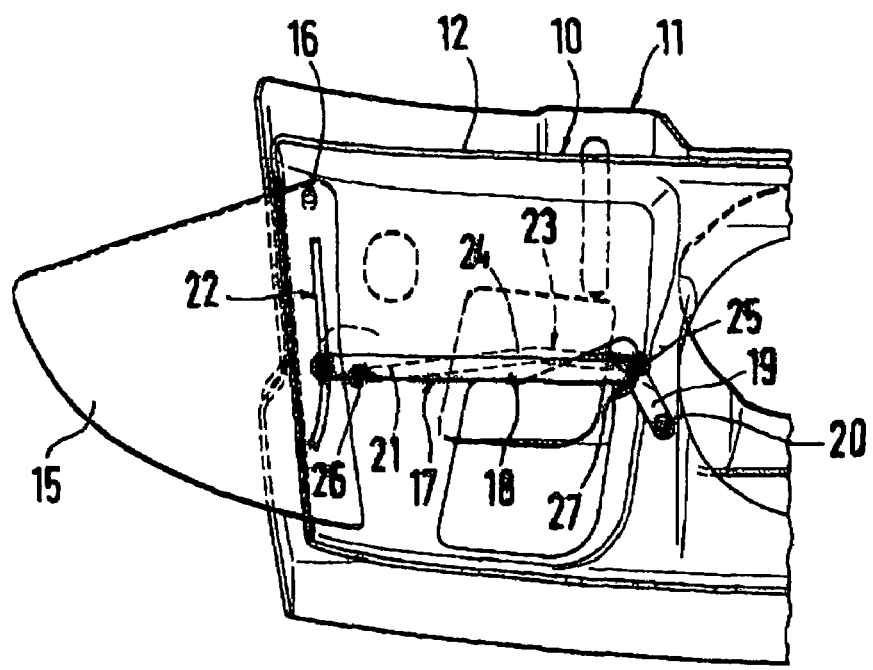
FIG. 8 is a detail view of the air guiding system of FIG. 8 in the operative position.

As demonstrated by a comparison of FIGS. 7 and 8, the lateral auxiliary air guiding elements 15 can be rotated with respect to the central main air guiding element 12 by an angle of approximately 90° about the respective pivot 16 fixed to the main air guiding element.

For coupling the change of the lateral auxiliary air guiding elements 15 between the inoperative position and the operative position with respect to the central main air guiding element 12 to the displacement of the main air guiding element 12, in the illustrated embodiment, a coupling device 23 is applied to the bent operating rods 18. The coupling device 23 mechanically couples the rotation of the corresponding auxiliary air guiding element 15 with respect to the main air guiding element 12 to the displacement of the main air guiding element 12. The coupling device 23 applied to an operating rod 18 is formed by a coupling element 24 hereinafter also referred to as the coupling rod but which also may be called a coupling guide rod.

On one side, each coupling rod 24 is connected in an articulated manner with the operating rod 18 of the operating device 17 of the respective auxiliary air guiding element 15 and, on the other side, is connected in an articulated manner with the vehicle body section 11 by way of joints 25, 26 that are preferably constructed as ball joints.

The coupling rod 24 illustrated in FIGS. 7 and 8 is applied by way of the joint 25 to a section 27 of the operating rod 18 of the operating device 17 in which the operating rod 18 is bent. The coupling device 23 provides a mechanical coupling of the rotating movement of the auxiliary air guiding elements with respect to the main air guiding element to the movement of the main air guiding element 12 during the displacement from the moved-in inoperative position into the moved-out operative position or from the moved-out operative position into the moved-in inoperative position, As a result of the mechanical coupling of the rotating movement of the auxiliary air guiding elements 15 relative to the main air guiding element 12 during the displacement of the main air guiding element 12 between the inoperative position and the operative position, only a single drive is required for the air guiding system 10 according to the present invention in order to change the latter from the inoperative position into the operative position or from the operative position into the inoperative position.

It is also contemplated that, for rotating the auxiliary air guiding elements, separate drives are assigned to the latter. The coupling of the adjustment of the auxiliary air guiding elements to the adjusting movement of the main air guiding element then no longer takes place mechanically but rather on the control side in that the drives of the auxiliary air guiding elements are coupled with the drive of the main air guiding element on the control side. In this type of arrangement, the auxiliary air guiding elements can then also be moved uncoupled from the main air guiding element in order to carry out the adjusting movements of the main air guiding element and the auxiliary air guiding elements, for example, successively. Likewise, in this case, for example, speed-dependent adjustments of the auxiliary air guiding elements can be implemented which are independent of a speed-dependent adjustment of the main air guiding element.

As a result of the operating rod 18 of each operating device 17 being applied to the connecting link guide 22 of the corresponding auxiliary air guiding element 15 and by virtue of the corresponding end 21 being guided in the connecting link guide 22, a maximal move-out position of the lateral auxiliary air guiding elements 15 already at a low move-out height of the central main air guiding element 12 can be achieved. During a further moving-out or erecting of the main air guiding element 12, the lateral auxiliary air guiding elements 15 will then stop; the operating rod 18 will then run idle in the connecting link guide 22. In this manner, for example, in a driving-speed-controlled fashion, different move-out heights of the central main air guiding element 12 can be obtained without having to adapt the mechanical coupling kinematics to the lateral auxiliary air guiding elements 15.

The move-out movement of the lateral auxiliary air guiding elements 15 with respect to the central main air guiding element 12 can be limited by stops (not shown).

For a better support of the lateral auxiliary air guiding elements 15 on the central main air guiding element 12, fixing devices or connecting link guides (not shown) can be provided in order to support the lateral auxiliary air guiding elements 15 during the rotating movement about a pivot 16 fixed to the main air guiding element or during the move-out movement from the main air guiding element 12 at a further point in the central main air guiding element 12.

The foregoing disclosure has been set forth manly to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Vehicle air guiding system arranged in a vehicle rear area, comprising at least one central main air guiding element arranged to be displaceable between a moved-in inoperative position and a moved-out operative position, and lateral auxiliary air guiding elements arranged to be displaceable together with the at least one central main air guiding element, wherein the lateral auxiliary air guiding elements are arranged to be rotatable with respect to the at least one central main air guiding element about a respective pivot fixed to the at least one central main air guiding element in order to change the lateral auxiliary air guiding elements from an also moved-in inoperative position into an also moved-out operative position;

wherein an operating device is operatively associated with each of the lateral auxiliary air guiding elements for rotation thereof with respect to the at least one central main air guiding element;

wherein the lateral auxiliary air guiding elements can be changed isochronously or simultaneously with the displacement of the at least one central main air guiding element from the also moved-in inoperative position into the also moved-out operative position; and wherein a coupling device is operatively associated with the operating device and mechanically couples a rotation of a respective one of the lateral auxiliary air guiding elements with respect to the displacement of the at least one central main air guiding element.

2. The vehicle air guiding system according to claim 1, wherein the operating device comprises an operating element having a first end operatively and articulatingly connected with the at least one central main air guiding element, a second end associated with a connecting link guide of a respective of one of the lateral auxiliary air guiding elements.

3. The vehicle air guiding system according to claim 2, wherein the operating element has a bent configuration.

4. The vehicle air guiding system according to claim 3, wherein the connecting link guide is so configured that a maximal move-out position of the lateral auxiliary air guiding elements is provided at a low move-out height of the at least one central main air guiding element.

5. The vehicle air guiding system according to claim 1, wherein the coupling device has a coupling element which, on one side, is articulatingly connected with the operating element of the operating device and, on another side, is articulatingly connected with a vehicle body section.

6. The vehicle air guiding system according claim 1, wherein separate drives are operatively associated with the lateral auxiliary air guiding elements and the at least one central main air guiding element.

7. The vehicle air guiding system according to claim 1, wherein the lateral auxiliary air guiding elements are arranged to be rotated about an angle of approximately 90° with respect to the at least one central main air guiding element for movement between the inoperative position and the operative position.

8. The vehicle air guiding system according claim 1, wherein the lateral auxiliary air guiding elements are hidden within vehicle structure in the inoperative position of the at least one central main air guiding element.

\* \* \* \* \*